United States Patent [19]

Sorbara et al.

[11] Patent Number: 5,331,670
[45] Date of Patent: Jul. 19, 1994

[54] SYNCHRONIZATION SCHEME FOR A DIGITAL COMMUNICATIONS SYSTEM

[75] Inventors: Massimo Sorbara, Freehold; Jean-Jacques Werner, Holmdel, both of N.J.

[73] Assignee: AT&T Bell Laboratories, Murray Hill, N.J.

[21] Appl. No.: 830,036

[22] Filed: Jan. 31, 1992

[51] Int. Cl.⁵ ............................................. H04L 7/04
[52] U.S. Cl. ............................ 375/111; 370/110.1; 370/105.1
[58] Field of Search ............... 375/8, 38, 39, 60, 94, 375/106, 114, 116; 370/110.1, 105.1; 371/43

[56] References Cited

U.S. PATENT DOCUMENTS

| | | | |
|---|---|---|---|
| 3,946,161 | 3/1976 | Husted et al. | 179/15 AF |
| 3,955,141 | 5/1976 | Lyon et al. | 325/38 A |
| 4,651,320 | 3/1987 | Thapar | 370/119 |
| 4,891,806 | 1/1990 | Farias et al. | 370/110.1 |
| 5,151,920 | 9/1992 | Haagh et al. | 375/1 |
| 5,170,413 | 12/1992 | Hess et al. | 375/38 |

FOREIGN PATENT DOCUMENTS

| | | | |
|---|---|---|---|
| 0302622 | 2/1989 | European Pat. Off. | H04J 3/07 |
| 2245457 | 6/1989 | United Kingdom | H04L 7/08 |
| 2232858 | 12/1990 | United Kingdom | H04L 25/49 |

OTHER PUBLICATIONS

U.S. Patent Application Serial No. 07/620868, Jean-Jacques Werner, "Digital Communications Synchronization Scheme," filed Nov. 30, 1990, allowed Feb. 18, 1992.

Primary Examiner—Stephen Chin
Attorney, Agent, or Firm—David R. Padnes

[57] ABSTRACT

A synchronization scheme for a digital communications system wherein customer data is connected to a synchronous communications network utilizes auxiliary symbols to provide frame synchronization. Each such auxiliary symbol lies outside of a conventional symbol constellation and is only used to represent framing information. Variations of the customer data rate relative to an expected rate are compensated for by the use of stuff and delete bits in each frame. These bits can be either customer data bits or ancillary bits depending on the direction of this variation. Advantageously, the auxiliary symbols also provide a determination of whether the stuff and delete bits in any frame are customer data or ancillary bits.

20 Claims, 5 Drawing Sheets

100

SYNCHRONIZATION SCHEME FOR A DIGITAL COMMUNICATIONS SYSTEM

TECHNICAL FIELD

The present invention relates to a synchronization scheme for digital communications systems and, more particularly, to such a scheme which provides both framing and compensation for asynchronous clock signals.

BACKGROUND OF THE INVENTION

In certain data communications applications, a customer supplies data bits to a modem connected to a subscriber loop of a synchronous communications network. The modem "bundles" the customer's data bits and "ancillary bits" into symbols which are transported through the subscriber loop. The ancillary bits are bits which provide a variety of functions, such as error-monitoring, control of remote equipment, etc., and also include dummy bits, i.e., bits which are inserted into an otherwise unfilled bit position to maintain the operation of communications equipment and then are discarded in the receiver. At the remote end of the loop, another modem unbundles the symbols back into customer data and ancillary bits, the latter being extracted prior to delivery of the customer bits to one or more customer-designated destinations.

To extract the ancillary bits from a bit stream of customer and ancillary bits, the bit stream is formatted into frames. Each frame includes a combination of customer and ancillary bits with each customer and ancillary bit inserted into a predefined bit position in a frame. To delineate one frame from another, each frame is identified by a framing bit, and the sequence of such bits in a succession of frames forms a predefined pattern of bit values. At the receiver, this pattern is detected and then the customer and ancillary bits are identified and processed.

One problem in data communications relates to acquiring frame synchronization or "framing". While a variety of framing schemes are known, they generally operate upon the detection of predetermined bit patterns extending over a succession of frames. As a result, acquiring framing requires a time interval extending over multiple frames. In certain data applications, this time interval is too long.

Another problem in data applications is that the customer's data rate may vary about some nominal expected rate. This problem exists in certain High-Rate Digital Subscriber Line (HDSL) applications, where the customer's data clock is "free-running" and, therefore, may vary from a nominal data rate expected by communications equipment connected to the subscriber loop and hereinafter referred to as the expected rate. As a result, at any particular time, the customer may be supplying more or less digital data per unit time than is nominally expected. To compensate for the overflow or underflow of customer data per unit time relative to that which is expected, one solution has been to incorporate "stuff" and "delete" bits into each frame.

The stuff and delete bits are inserted into predetermined additional bit positions in each frame and are either customer data bits or ancillary bits depending on the variation of the customer's data rate relative to the expected rate. More specifically, in the absence of such variation, i.e., the customer data rate equals the expected rate, a stuff bit is an ancillary bit. However, if the customer data rate exceeds the expected rate, then the stuff bits are customer bits. Similarly, each delete bit is a customer bit when the customer data rate equals the expected rate but is an ancillary bit when the customer data rate is less than the expected rate. Since stuff and delete bits must be delivered to the customer when they are customer bits and must be extracted from the bit stream delivered to the customer when they are ancillary bits, a mechanism for identifying whether the stuff and delete bits in each frame are customer or ancillary bits must be provided.

While the use of stuff and delete bits has provided a satisfactory solution to the problem of asynchronous customer and line clocks, there are problems in correctly identifying whether the stuff and delete bits are customer or ancillary bits in noisy communications channels.

In light of the foregoing, it would be extremely desirable if a technique could be devised which could provide rapid framing and robust stuff and delete bit identification in noisy communications channels.

SUMMARY OF THE INVENTION

The present invention overcomes the above-described shortcomings of the prior art with respect to framing and variations of a customer's data rate relative to an expected rate through the use of a technique wherein one or more customer data bits are bundled into symbols prior to transmission through a communications channel. The totality of such symbols defines a signal constellation and the outermost ones of such symbols define the constellation boundaries. In accordance with the present invention, auxiliary symbols which lie outside of a conventional signal constellation are not used to represent customer data but are utilized to provide frame synchronization. Preferably, the number of such auxiliary symbols is selected so that, in addition to providing framing, such auxiliary symbols also identify whether stuff and delete bits in a frame are filled with customer or ancillary bits.

A feature of the present invention is that it is applicable to formats wherein the number of bit positions in a given frame is fixed or variable from frame to frame.

DETAILED DESCRIPTION

Figure 1:
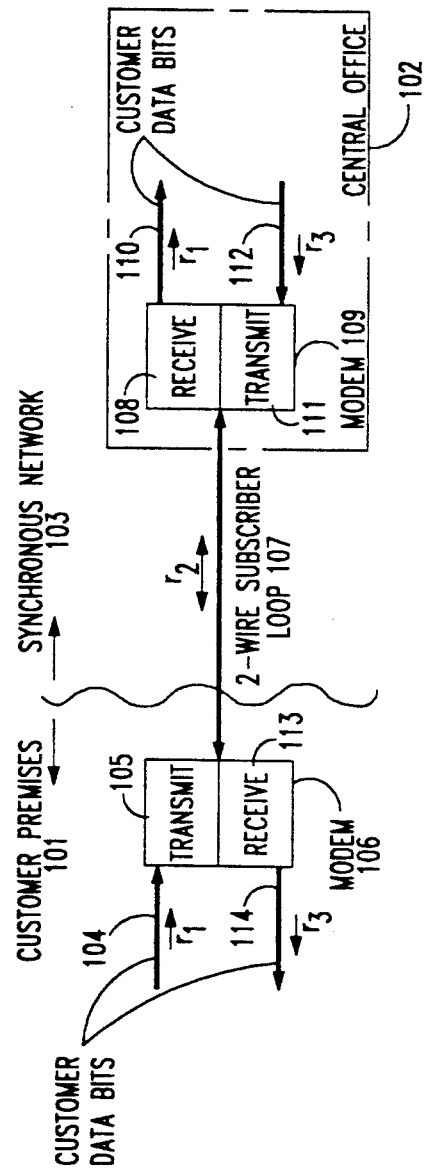
FIG. 1 is a block-schematic diagram of a communications system which incorporates the present invention.

FIG. 1 shows an illustrative communications system 100 which incorporates the present invention and which provides communications capabilities between customer premises 101 and central office 102 in synchronous network 103. As shown, customer data bits on lead 104 are coupled through the transmit portion 105 of modem 106 in customer premises 101. Transmit portion 105 processes the customer data bits into a form suitable for transmission through two-wire subscriber loop 107 of network 103. As will be discussed more fully below, this processing first arranges the customer data bits to conform to a particular "frame" format. Each frame includes a predetermined number of bits and one frame is delineated from another by the use of framing bits which are inserted into each frame by transmit portion 105. The processing in transmit portion 105 then converts the bits in these frames to symbols which are transmitted through loop 107. The conversion of bits to symbols is accomplished using well-known techniques. These symbols are then transmitted through loop 107 using any of a variety of modulation schemes. One such scheme is quadrature amplitude modulation (QAM), variations of which are also known as amplitude phase shift keying (APSK) and Carrierless Amplitude Modulation/Phase Modulation.

The remote end of loop 107 terminates at the receive portion 108 of modem 109 located within central office 102. Within receive portion 108, the customer data bits are recovered from the symbols received from loop 107 and thence coupled to lead 110. Led 110 delivers the customer data bits to other circuitry and/or communications paths (both not shown) which ultimately provide the customer data bits to one or more predesignated destinations.

The customer data bits supplied on lead 104 and delivered on lead 110 are at a data rate $r_1$. Loop 107, however, provides two-way digital communication at a data rate $r_2$ which is not synchronized with data rate $r_1$.

Similarly, in the opposite direction, transmit portion 111 of modem 109 receives customer data bits on lead 112 and processes such bits in the same manner as transmit portion 105 so as to provide symbols which are coupled through loop 107. Receive portion 113 of modem 106 recovers the customer data bits from the received symbols and couples such bits to lead 114. The customer data bits supplied on lead 112 and delivered on lead 114 have a data rate $r_3$ which again is not synchronized to the line data rate $r_2$ of loop 107.

The present invention addresses the problems associated with distinguishing one frame from another and those associated with the variation of customer data rates $r_1$ and $r_3$ with respect to line data rate $r_2$.

Figure 2:
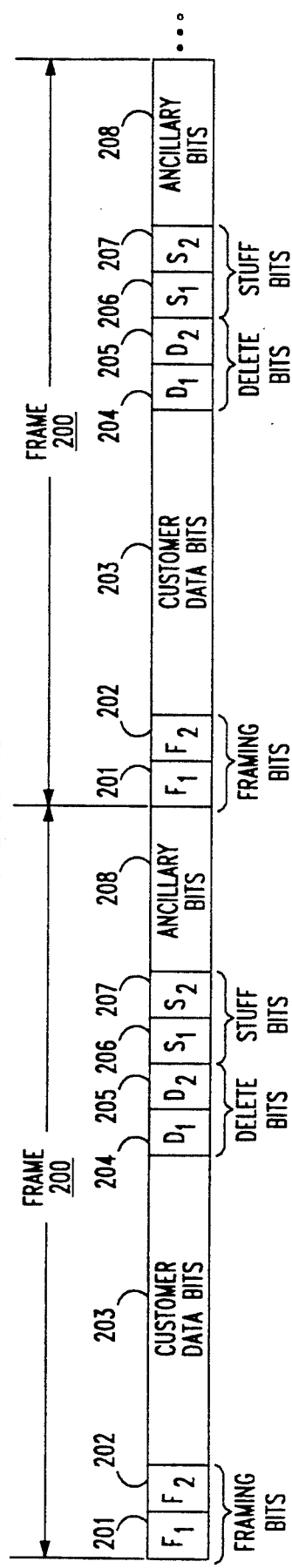
FIG. 2 is a representation of a first frame format suitable for use in the communications system of FIG. 1.

Refer now to FIG. 2 which depicts an illustrative frame format suitable for use in system 100. As shown, each frame 200 in a succession of such frames includes the same number of bit positions. A plurality of bit positions 201 is reserved for the bits representative of a first framing signal, designated as $F_1$. Another plurality of bit positions 202 is reserved for the bits representative of a second framing signal, designated as $F_2$. The majority of the bit positions in a frame is reserved for customer data bits and such bit positions are collectively designated as 203. To compensate for the asynchronism between the customer and line data rates, each frame advantageously incorporates delete bits and stuff bits. The delete bits, designated as $D_1$ and $D_2$, are disposed in bit positions 204 and 205 while the stuff bits, designated as $S_1$ and $S_2$, are disposed in bit positions 206 and 207. The remaining bit positions, designated as 208, are allocated for ancillary bits.

Within each frame 200, stuff bits $S_1$ and $S_2$ are ancillary bits and delete bits $D_1$ and $D_2$ are customer data bits when the customer data rate and expected rate are the same. However, if the customer data rate is faster than the expected rate, then the stuff and delete bits are customer bits. Similarly, each delete bit normally is a customer bit but will be an ancillary bit along with the stuff bits when the customer's data rate is slower than the expected rate. Since stuff and delete bits must be delivered to the customer for error-free operation when they are customer bits and extracted from the customer bit stream when they are ancillary bits, a mechanism for identifying whether the stuff and delete bits are either customer or ancillary bits in each frame must be provided. For the frame format of FIG. 2, this mechanism is provided by detecting the values of successive framing symbols $F_1$ and $F_2$ assigned to each frame.

Figure 3:
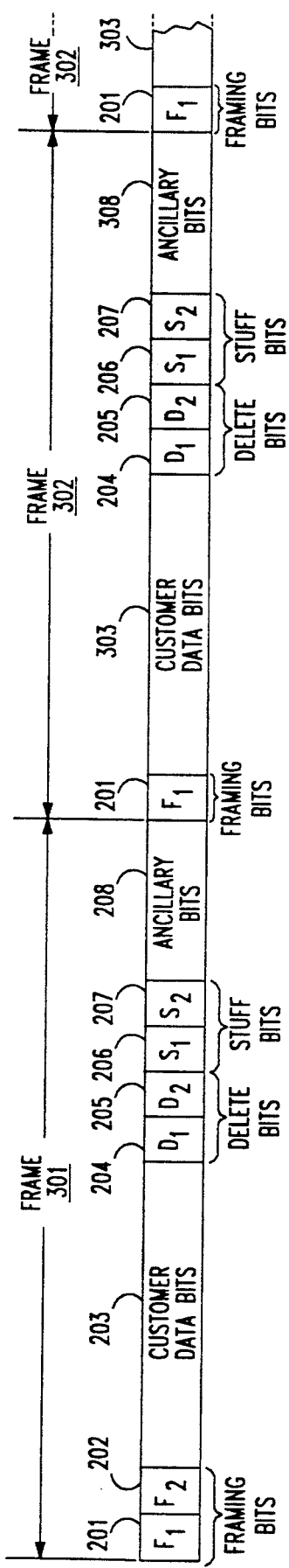
FIG. 3 is a representation of a second frame format suitable for use in the communications system of FIG. 1.

FIG. 3 illustrates another frame format 300 which is suitable for use in system 100. The first frame 301 of format 300 is identical to frame 200 of FIG. 2 and corresponding portions of these frames bear the same reference designations. A plurality of bit positions 201 is reserved for bits representative of a first framing symbol $F_1$ and another plurality of bit positions 202 is reserved for bits representative of a second framing symbol $F_2$. After this first frame 301, which is transmitted at start up, each subsequent frame 302 has only one plurality of bit positions 201 reserved for a single framing symbol designated as $F_1$. The balance of frame 302 is identical to frame 301. This use of only one framing symbol per frame after the first frame advantageously saves bandwidth which can be allocated to customer data and/or ancillary bits.

When using the frame format 300, system 100 identifies each frame by detecting at least one frame symbol associated with that frame. To identify whether the stuff and delete bits associated with a frame are customer or ancillary bits, system 100 operates in the same manner for the format of FIG. 3 as for the frame format of FIG. 2 for the first frame 301. That is, the question of whether the stuff and delete bits are customer or ancillary bits is determined by examining the successive framing symbols associated with the first frame. However, for subsequent frames 301 in format 300 there is only one framing symbol. To compensate for this limitation, the operation of system 100 is modified so that the question of identifying whether the stuff and delete bits are customer data or ancillary bits in a particular frame is answered by examining the value of the framing symbol for that frame along with the framing symbol value from a preceding frame. For example, for the second frame, the framing symbol for that frame along with the second framing symbol for the first frame is examined. Or, in general, it may be said that for the $n^{th}$ frame, where n is any integer greater than 1, the determination of whether the stuff and delete bits in the $n^{th}$ frame are customer data or ancillary bits is determined by examining the framing symbol values for the $n^{th}$ and $(n-1)^{th}$ frame.

Before proceeding further, it should, of course, be understood that other frame arrangements are also possible for use in the present invention. For example, while a particular arrangement of bit types, i.e., framing, customer data, stuff, delete and ancillary, are shown in FIGS. 2 and 3, the order of such bit types in a frame is virtually unlimited and the bits of any type need not be in consecutive bit positions.

Figure 4:
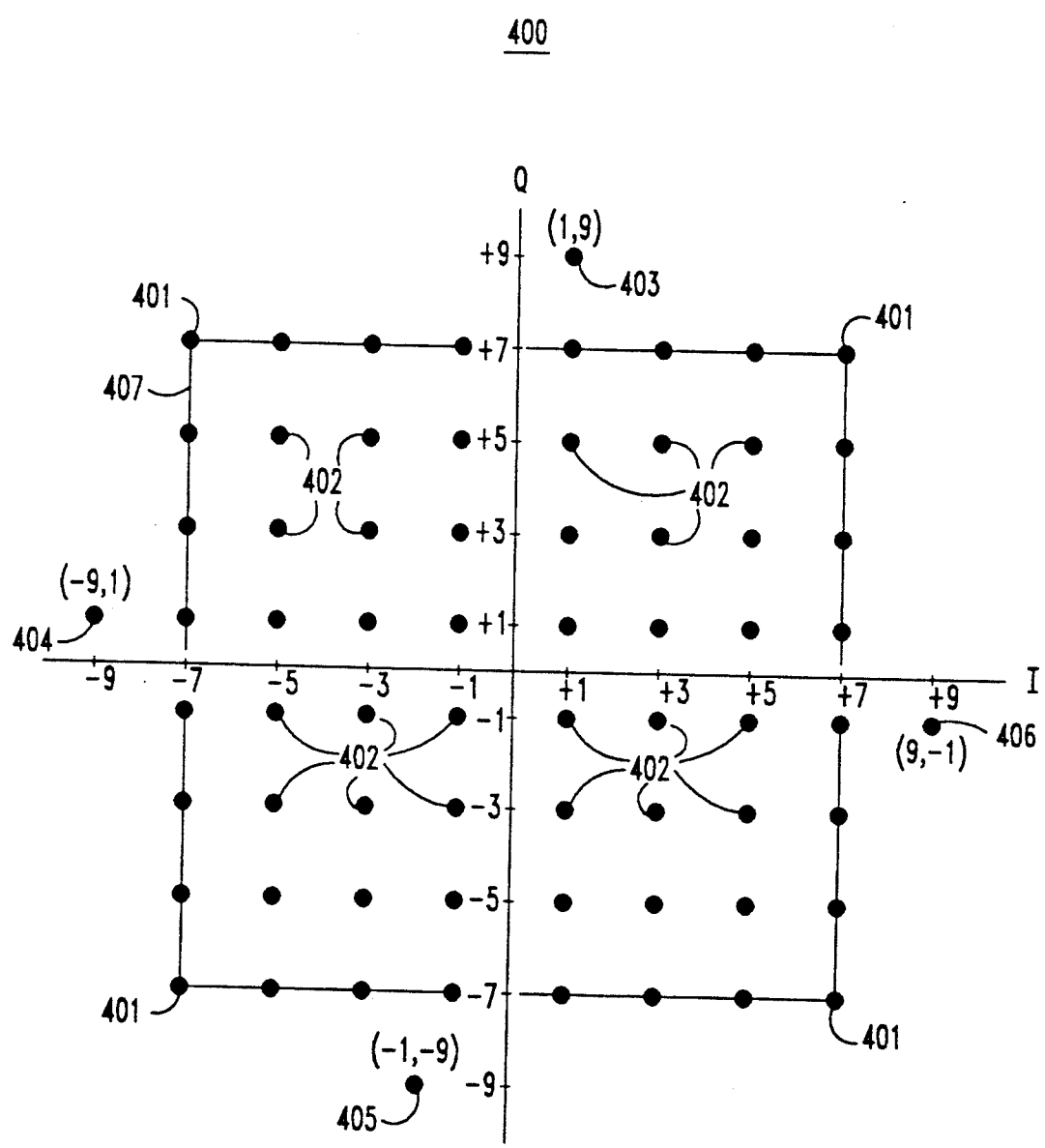
FIG. 4 is a representation of a symbol constellation utilized in the communications system of FIG. 1.

FIG. 4 shows an illustrative symbol constellation 400 in accordance with the present invention. This constellation represents the totality of symbols into which the bits of a frame are mapped within each modem. Constellation 400 includes a conventional 64 QAM symbol constellation and four additional symbols. Each symbol in the conventional 64 QAM constellation is representative of 6 bits in a frame and 3 of these bits are associated with the in-phase (I) symbol component and 3 of these bits are associated with the quadrature (Q) component. The I and Q transmitted symbol components in the 64 QAM constellation have values which are uncorrelated with one another and such values may be +7, +5, +3, +1, −1, −3, −5 and −7. Reference numerals 401 and 402 respectively designate the four outermost and 60 other symbols in this constellation.

The four additional symbols are designated by reference numerals 403, 404, 405 and 406. Symbol 403 respectively has an I and Q symbol component value of +1,+9; symbol 404 respectively has an I and Q symbol component value of −9,+1; symbol 405 respectively has an I and Q symbol component value of −1,−9; and symbol 406 respectively has an I and Q symbol component value of 9,−1. Each of symbols 403-406 lies outside of the conventional 64 QAM constellation, i.e., each lies outside of the boundary 407 which encompasses all of the 64 symbols in the conventional 64 QAM constellation and which passes through the four outermost symbols 401. For this reason, symbols 403-406 may be referred to as "out-of-constellation" symbols. Of course, the present invention may utilize "out of constellation" symbols having values other than those stated above.

Pursuant to the present invention, each of the plurality of framing bits in a frame is mapped into one of the additional symbols 403-406. The remaining bits in the frame are mapped to the appropriate symbols in the 64 QAM symbol constellation. The detection of the framing symbols delineates each frame. In addition, an examination of two successive framing symbols also provides a determination of whether the bits in the stuff and delete positions in a frame are customer bits or ancillary bits. If the frame format of FIG. 2 is utilized, the two successive framing bits examined are those associated with a single frame. However, if the frame format of FIG. 3 is utilized, the two successive framing bits examined after start up are those associated with two consecutive frames. One suitable algorithm for determining whether the stuff and delete bits are customer or ancillary bits is shown in Table 1. Of course, Table I illustrates one possible assignment and other assignments are possible.

TABLE I

| Angle θ | Stuff Bits | Delete Bits |
| --- | --- | --- |
| +90° | Customer Data Bits | Customer Data Bits |
| −90° | Ancillary Bits | Ancillary Bits |
| 180° | Ancillary Bits | Customer Data Bits |
| 0° | Undefined | Undefined |

Referring to Table 1 and FIG. 4, the angle θ denotes an angle formed by interconnecting each of two successive framing symbols to the origin of FIG. 4 via a straight line. For +90° and −90°, angle θ is the smaller of the two angles formed between the straight lines and for 180°, angle θ is either one of the two angles formed. A "positive" 90° angle arises when a traverse of the shortest route from first to the second of the two successive framing symbols is a counterclockwise movement. Similarly, a "negative" 90° angle arises when such a traverse is a clockwise movement. Using this algorithm, the detection of one framing symbol followed by another framing symbol which forms an angle θ of 180° indicates that the stuff and delete bits in the frame associated with the second of the two successive framing symbols are ancillary and customer data bits, respectively. Referring to FIG. 4, there are four possible combinations of two successive framing symbols to indicate this condition. These four combinations are symbol 403 followed by symbol 405, symbol 404 followed by symbol 406, symbol 405 followed by symbol 403 or symbol 406 followed by symbol 404. Similarly, the assignment of two successive framing symbols which form an angle θ of −90° indicates that both the stuff and delete bits in the frame associated with the second of the two successive framing symbols are ancillary bits. Referring to FIG. 4, there are four possible combinations of framing symbols to indicate this condition. Such combinations are symbol 403 followed by symbol 406, symbol 406 followed by symbol 405, symbol 405 followed by symbol 404, or symbol 404 followed by symbol 403. The assignment of two successive framing symbols which form an angle θ of +90° indicate that the stuff and delete bits in the frame associated with the second of two successive framing symbols are customer data bits. Four possible combinations of framing symbols can indicate this condition. Such combinations are symbol 403 followed by symbol 404, symbol 404 followed by symbol 405, symbol 405 followed by symbol 406, or symbol 406 followed by symbol 403. Finally, two successive framing symbols forming a 0° angle provide no identification relative to the stuff and delete bits and, accordingly, Table I for a 0° angle provides an undefined result.

Figure 5:
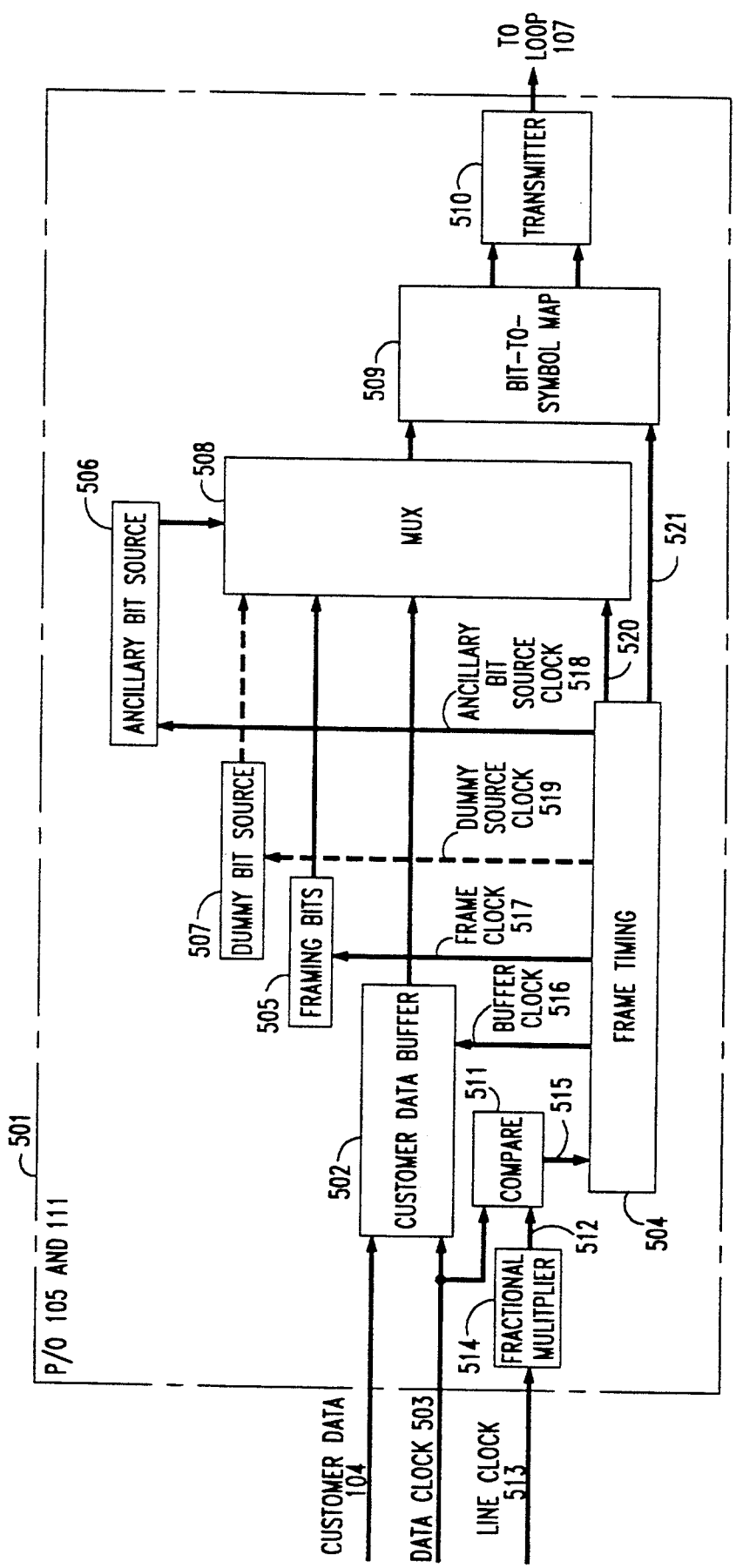
FIGS. 5 and 6 respectively are block-schematic diagrams of the transmit and receive portions of the modems in the communications system of FIG. 1.

Refer now to FIG. 5 which shows an illustrative circuit 501 incorporated into conventional transmit portion 105 of modem 105 and conventional transmit portion 111 of modem 112 for implementing the present invention. The customer data bits on lead 104 are strobed into customer data bit buffer 502 using the data clock on lead 503. This clock is generated by examining the data bits on lead 104 using well-known circuitry (not shown). Frame timing circuit 504 generates several control signals which govern the reading out of customer data bits from buffer 502, framing bits representative of the appropriate framing symbol from framing bit source 505, ancillary bits from ancillary bit source 506. Source 506 provides a secondary channel to provide different capabilities such as error monitoring and control of remote equipment. If desired, the species of ancillary bits referred to herein as dummy bits can be used for the stuff and delete bits in accordance with relative phase of the customer and network clock signals. These dummy bits merely fill a bit position that would be otherwise empty and are discarded in the receiver. Multiplexer 508, also controlled by frame timing control circuit 504, multiplexes the bits outputted by the buffer 502 and sources 505-507 so as to conform to a particular frame format. Bit-to-symbol mapper 509 maps the bits received from the multiplexer into appropriate symbols which are then coupled through a conventional transmitter 510 to the subscriber loop.

In the frame formats of either FIG. 2 or 3, the bit positions 203 and 303 are always reserved for customer data bits and the framing bits are always inserted into positions 201 and 202. Therefore, strobing the appropriate source or buffer merely involves counting the number of bit positions from the beginning of the frame. The selection of the framing bits representative of the appropriate one of the four auxiliary symbols, however, requires knowledge of whether the customer data rate is faster or slower than the expected rate. In addition, whether the stuff and delete bits are customer data bits or ancillary bits depends on the results of this determination. Comparator circuit 511 provides this determination by comparing the customer data clock on lead 503 to a derived clock signal on lead 512. This derived clock signal is generated by coupling the line clock on lead 513 through fractional multiplier 514. Multiplier 514 multiplies the line clock by a predetermined fraction representative of the total bandwidth less that occupied by the plurality of bit positions 203 or 303 to generate the line data clock. The results of the comparison provided by comparator circuit 512 is provided to frame timing circuit 504 via lead 515. Circuit 504 in response thereto provides a buffer clock on lead 516 which strobes buffer 502 to read out customer data bits during the time intervals corresponding to bit positions 203 and during stuff and delete bit positions 204 through 207 when the results of the clock comparison indicate that such bit positions are to be filled with customer data bits. Circuit 54 also provides a framing bit clock on lead 517 so as to provide framing bits during bit positions 201 and 202 corresponding to the appropriate framing symbol. Similarly, ancillary bit source clock on lead 518 controls the reading out of ancillary bits from ancillary bit source 506 during bit positions 208 and during the stuff and delete bit positions 204–207, when appropriate. In lieu of inserting ancillary bits, which convey secondary channel information during the stuff and delete bit positions, the species of ancillary bits referred to as dummy bits from dummy bit source 507 can be inserted into such bit positions using dummy bit source clock on lead 519. Control of multiplexer 508 so as to multiplex the appropriate bits at the appropriate times is provided via a control signal on lead 520. Another control signal on lead 521 signals mapper 509 of the arrival of bits corresponding to a framing symbol. In response to this control signal, mapper 509 maps such bits into the corresponding auxiliary symbol and not the corresponding one of the 64 conventional QAM symbols.

Figure 6:
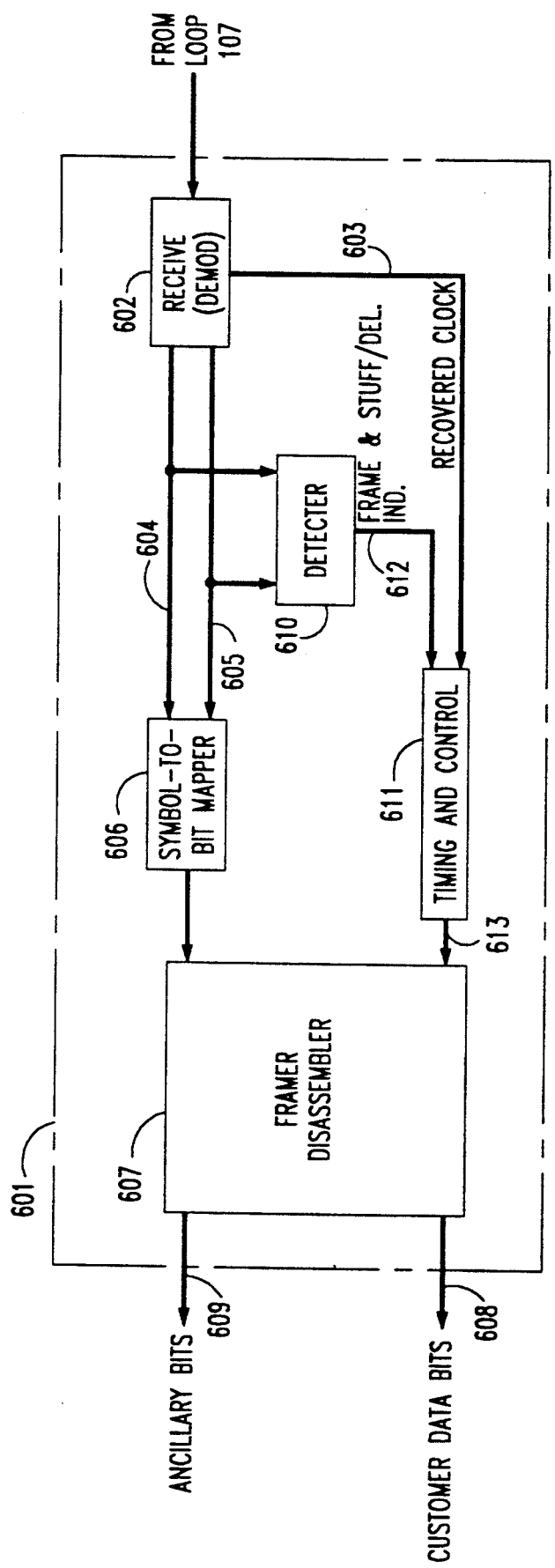

An embodiment of circuitry 601 incorporated into the receive portion 108 of modem 109 and receive portion 113 of modem 106 for implementing the present invention is shown in FIG. 6. The received signal from loop 107 is coupled through receiver circuit 602 which recovers a clock signal from the received signal and outputs this clock signal on lead 603. Receiver circuit 602 also demodulates the received signal so as to recover the I and Q symbol components which are then coupled via leads 604 and 605 to symbol-to-bit mapper 606. Mapper 606 maps the received symbol components of each of the 64 QAM symbols into their corresponding bits and ignores the framing symbol components. The regenerated bits from mapper 606 are supplied to frame disassembler 607 which couples the customer data bits to lead 608 and the ancillary bits representing secondary channel information to lead 609. If dummy bits have been inserted into the stuff and delete bit positions, this fact must be a priori known to circuitry 601 and such bits are "thrown away" by disassembler 607 and are not coupled to either of leads 608 or 609.

For frame disassembler 607 to properly separate the customer data and ancillary bits from one another, the beginning of each frame must be determined. Detector 610 provides this function by examining the symbol components on leads 604 and 605. Upon detecting the symbol components corresponding to any one of the four "out of constellation" symbols, detector 610 outputs a control signal indicating the beginning of a frame to timing and control circuit 611 via lead 612. With this frame signal, circuit 611 provides signals to disassembler 607 via lead 613 which causes the disassembler to couple the customer data bits in bit positions 203 to lead 608 and the ancillary bits in bit positions 208 to lead 609. Detector 610 also stores the values of successive framing symbol components and from an examination of these values determines whether the stuff and delete bits are customer data or ancillary bits. This determination is also conveyed to timing and control circuit 611 via another control signal on lead 612. Circuit 611, upon receipt of this control signal, directs disassembler 608 to couple the bits in the stuff and delete bit positions to lead 608 if customer data bits, lead 609 if ancillary bits or throw such bits away if dummy bits.

It should, of course, be understood that while the present invention has been disclosed in reference to the disclosed embodiments, other arrangements should be apparent to those of ordinary skill in the art. First, for example, while in the disclosed frame formats of FIGS. 2 and 3, the number of bit positions in each frame is the same from frame to frame, the present invention is also applicable to frame formats wherein the number of bit positions in each frame may vary from frame to frame. In such an arrangement, each frame would have a nominal number of bit positions including positions reserved for one or more framing symbols, customer data bits, ancillary bits and delete bits. The stuff bit positions would not be present. The stuff bit positions would only be added and would convey customer data bits when the customer data rate is faster than the expected rate. Accordingly, once this is done, the frame length would be longer than the nominal frame length by the number of stuff bit positions. Similarly, if the customer data rate is slower than the expected rate, then the delete bit positions are removed and the frame length is shorter than the nominal frame length by the number of delete bit positions. Second, while in the disclosed frame format of FIG. 3, there are two framing symbols associated with the first frame and one framing symbol associated with each subsequent frame, the present invention could be used in a frame format utilizing only one framing symbol in all frames. The invention would operate for this format in this same manner as that described for the subsequent frames of the format of FIG. 3. That is, the determination of the type of bits in the stuff and delete bit positions, or the presence of such bit positions, would be determined from an examination of successive framing symbols. Of course, the information in the first frame might be incorrectly recovered, but this first frame could be arranged to contain inconsequential information and could be transmitted during a start-up procedure. Third, while the present invention has been disclosed in reference to the use of a particular modulation scheme, use with other modulation scheme is possible. Indeed, the present invention is applicable to baseband arrangements wherein bits are conveyed through a communications channel. Finally, while the embodiments of the present invention have been described in reference to discrete functional elements, the function of one or more of these elements can be provided by one or more appropriately programmed general-purpose processors, or special-purpose integrated circuits, or digital signal processors, or an analog or hybrid counterpart of any of these devices.

We claim:

1. Apparatus for use in a communications system, said apparatus comprising a transmitter and receiver respectively connected to different ends of a communications channel, said transmitter comprising means for receiving customer data bits and arranging them into a succession of frames, each frame including a predetermined number of bits, and means for generating a succession of data symbols representative of said customer data bits in each frame along with a framing symbol which identifies each frame so as to enable delineation of one frame from another in said succession, each framing symbol being different from any of the data symbols and lying outside of a boundary encompassing said plurality of data symbols and formed by interconnecting outermost data symbols in said symbol constellation, and said receiver comprising means for examining said framing symbols, and means responsive to the examination of said framing symbols for mapping said data symbols into their representative customer data bits and for identifying each frame in said succession of frames.

2. Apparatus for use in a digital communications system wherein a plurality of data symbols forming a symbol constellation are transmitted through a communications channel, each symbol being representative of a plurality of customer data bits, said apparatus comprising means for receiving said customer data bits and arranging them into a succession of frames, each frame including a predetermined number of bits, and means for generating a succession of data symbols representative of said customer data bits in each frame along with at least one framing symbol which identifies each frame so as to enable delineation of one frame from another in said succession, each framing symbol being different from any of the data symbols and lying outside of a boundary encompassing said plurality of data symbols and formed by interconnecting outermost data symbols in said symbol constellation.

3. The apparatus of claim 2 wherein said arranging means arranges said customer data bits into frames having the same number of bit positions from frame to frame.

4. The apparatus of claim 2 wherein said arranging means arranges said customer data bits into frames having a variable number of bit positions from frame to frame.

5. The apparatus of claim 2 wherein said arranging means arranges each frame to include other bit positions into which bits from different bit sources can be inserted and said framing symbol also identifies the source of each bit in such bit positions.

6. The apparatus of claim 5 wherein said arranging means selects a source from said different sources for each of said other bit positions after examining two clock signals.

7. The apparatus of claim 6 wherein one of said clock signals is that which controls the rate of said received customer data bits and the other is that which controls said communications through said communications channel.

8. A method for use in a digital communications system wherein a plurality of data symbols forming a symbol constellation are transmitted through a communications channel, each data symbol being representative of a plurality of customer data bits, said method comprising the steps of receiving said customer data bits and arranging them into a succession of frames, each frame including a predetermined number of bits, and generating a succession of data symbols representative of said customer data bits in each frame along with a framing symbol which identifies each frame so as to enable delineation of one frame from another in said succession, each framing symbol being different from any of the data symbols and lying outside of a boundary encompassing said plurality of data symbols and formed by interconnecting outermost data symbols in said symbol constellation.

9. Apparatus for use in a digital communications system wherein a plurality of data symbols forming a symbol constellation are transmitted through a communications channel, each data symbol being representative of a plurality of customer data bits said bits being arranged into a succession of frames, said apparatus comprising means for examining auxiliary symbols which have also been transmitted through said communications channel and are different from any of said data symbols, and means responsive to the examination of said auxiliary symbols for mapping said data symbols into their representative customer data bits and for identifying each frame in said succession of frames.

10. The apparatus of claim 9 wherein each auxiliary symbol lies outside of a boundary formed by interconnecting outermost data symbols in said symbol constellation and encompassing said plurality of data symbols in said symbol constellation.

11. The apparatus of claim 9 wherein the frames identified have the same number of bit positions from frame to frame.

12. The apparatus of claim 9 wherein the frames identified have a variable number of bit positions from frame to frame.

13. The apparatus of claim 9 wherein each frame is said succession includes certain bit positions into each of which a bit from one of a plurality of different bit sources can be inserted and said auxiliary symbol examination also provides an identification of the source associated with each bit in said certain bit positions.

14. The apparatus of claim 13 wherein the source of bits which are inserted into said certain bit positions is based on an examination of two clock signals.

15. The apparatus of claim 13 wherein one of said clock signals is that which controlled the rate of said received customer data bits supplied to a transmitter at a remote end of said communications channel and the other is that which controls said communications through said communications channel.

16. Apparatus for use in the communication system wherein a plurality of symbols forming a symbol constellation are transmitted through a communications channel, said apparatus comprising means for receiving a succession of symbols arranged into frames, each frame including symbols which are representative of customer data bits, and framing symbols which serve to delineate one frame from another, and means for extracting said framing symbols in said received succession of symbols and outputting customer data bits representative of each symbol, said framing symbols being different from any of the data symbols and lying outside of a boundary encompassing said plurality of data symbols and formed by interconnecting outermost data symbols in said symbol constellation.

17. Apparatus for use in a communications system which receives and delivers bits representing customer data, said apparatus comprising means for arranging the customer data bits into a succession of frames, each frame including a plurality of customer data bits along with other bits, each of these other bits being selected from one of a plurality of sources based on a predetermined criteria, and means for providing a predetermined pattern of bits per frame, said pattern serving to delineate one frame from another and also to identify the selected source for each of the other bits.

18. Apparatus for use in a digital communications system wherein a plurality of symbols forming a symbol constellation are transmitted through a communications channel, said apparatus comprising means for receiving customer data bits and arranging them into a succession of frames, each frame including a predetermined number of bit positions allocated for customer data bits and a predetermined number of other bit positions into which bits from different bit sources can be inserted, and means for generating a succession of symbols representative of the bits in the bit positions in said succession of frames along with at least one framing symbol for each frame, said framing symbol identifying each frame and being different from any of the symbols and said framing symbol serving to identify the source of each bit in said other bit positions.

19. Apparatus for use in the communications system which receives and delivers bits representing customer data, said apparatus comprising means for receiving a succession of frames, each frame including at least one framing bit, a plurality of customer data bits and other bits, each these other bits being selected from one of a plurality of sources based on a predetermined criteria, and means responsive to an examination of said framing bits for identifying the source of each of said other bits in said succession of frames.

20. Apparatus for use in a digital communications system wherein a plurality of symbols forming a symbol constellation are transmitted through a communications channel, said apparatus comprising means for receiving a succession of symbols arranged into frames, each frame including first symbols, second symbols, and framing symbols, and means for examining said framing symbols in said received succession of symbols and outputting customer data bits representative of each first symbol, said examining means also outputting customer data bits representative of said second symbols and not outputting customer data bits representative of these symbols in response to different results of said examination.

* * * * *